United States Patent
Lawson (10) Patent No.: US 11,541,547 B2
(45) Date of Patent: Jan. 3, 2023

(54) VACUUM LIFTING SYSTEM

(71) Applicant: Darren Wayde Lawson, St. Petersburg, FL (US)

(72) Inventor: Darren Wayde Lawson, St. Petersburg, FL (US)

(*) Notice: Subject to any disclaimer, the term of this patent is extended or adjusted under 35 U.S.C. 154(b) by 395 days.

(21) Appl. No.: 16/897,381

(22) Filed: Jun. 10, 2020

(65) Prior Publication Data
US 2021/0170604 A1     Jun. 10, 2021

Related U.S. Application Data

(60) Provisional application No. 62/872,223, filed on Jul. 9, 2019.

(51) Int. Cl.
| | |
|---|---|
| *G06F 17/00* | (2019.01) |
| *B25J 11/00* | (2006.01) |
| *B25J 15/06* | (2006.01) |
| *F04B 39/16* | (2006.01) |
| *F04B 37/14* | (2006.01) |
| *B25J 13/00* | (2006.01) |

(52) U.S. Cl.
CPC ............... *B25J 11/00* (2013.01); *B25J 13/00* (2013.01); *B25J 15/0616* (2013.01); *F04B 37/14* (2013.01); *F04B 39/16* (2013.01)

(58) Field of Classification Search
CPC ........ B25J 11/00; B25J 13/00; B25J 15/0616; B25J 9/044; F04B 37/14; F04B 39/16; F04B 39/123; B66C 1/0275; B66C 1/0281; B66C 1/0293

USPC ........................................................ 414/627
See application file for complete search history.

(56) References Cited

U.S. PATENT DOCUMENTS

| | | | | |
|---|---|---|---|---|
| 3,630,389 | A * | 12/1971 | Schmidt ..................... | B25J 3/04 414/743 |
| 6,056,500 | A * | 5/2000 | Wicen ................... | B66C 1/0256 294/185 |
| 7,296,979 | B2 * | 11/2007 | Raab ..................... | B25B 11/005 248/205.8 |
| 7,546,689 | B2 * | 6/2009 | Ferrari ................. | G01B 5/0014 33/503 |

(Continued)

FOREIGN PATENT DOCUMENTS

| | | | | |
|---|---|---|---|---|
| CA | 2250404 | C * | 6/2007 | .......... B66C 1/0256 |
| CN | 108127641 | A * | 6/2018 | .......... B25J 15/0616 |
| JP | 3185970 | B2 * | 7/2001 | |

*Primary Examiner* — Ronnie M Mancho
(74) *Attorney, Agent, or Firm* — The Patent Professor; John Rizvi (57) ABSTRACT

A vacuum operated object lifting system is disclosed that can use air pressure differentials to anchor the lifting system to the floor or other structure. The vacuum lifting system includes a main structure having a space defined in the bottom thereof and a lifting arm system extending from the main structure for grasping and moving a load. The vacuum lifting system includes a vacuum pumping system including an air pump and a conduit system extending from the air pump to the space in the bottom of the main structure. Use of the air pump to draw air out of the conduit system creates pressure differential between ambient air pressure and air pressure in the space of the main structure to anchor the vacuum lifting system to the ground. The vacuum pumping system may also grasp the load by suction.

20 Claims, 8 Drawing Sheets

(56) References Cited

U.S. PATENT DOCUMENTS

| | | | | |
|---|---|---|---|---|
| 7,984,558 B2* | 7/2011 | Ferrari | ................ | G01B 21/047 |
| | | | | 33/503 |
| 8,127,458 B1* | 3/2012 | Ferrari | .................. | G01B 5/012 |
| | | | | 33/503 |
| 9,527,697 B2* | 12/2016 | Steffes | ................. | F16L 27/087 |
| 2014/0360961 A1* | 12/2014 | Steffes | ................... | B66C 23/04 |
| | | | | 285/272 |
| 2021/0170604 A1* | 6/2021 | Lawson | .................. | B25J 9/044 |

* cited by examiner

VACUUM LIFTING SYSTEM

CROSS-REFERENCE TO RELATED APPLICATION

This application claims the benefit of U.S. Provisional Patent Application No. 62/872,223, filed on Jul. 9, 2019, which is incorporated by reference herein in its entirety.

FIELD OF THE INVENTION

The present invention relates generally to material lifting systems for lifting and moving objects and, more particularly, to a portable vacuum lifting system that utilizes a vacuum or suction force to anchor the system to the ground or floor as well as lift an object off of a surface, and that can optionally operate in reverse to hover the system on the ground and facilitate transportation of the system relative to the ground.

BACKGROUND OF THE INVENTION

Material lifting systems are commonly used in commercial applications to move objects, such as, but not limited to, small parts, various size packages, and larger objects off of surfaces such as floors, tables, conveyor belts, etc. and reposition them to another location or temporarily hold them aloft above a moving surface. These systems typically have a main structure secured to the ground or other surface and a lifting arm system terminating in a head, clamp, claw or other type of applicable instrument capable of grasping or holding the object or load. The arm system generally extends from the main structure.

When the arm system is grasping, and supporting, the object or load, the arm system and/or object exert an angular moment force or pull on the main structure which tends to pull or tip the lifting system over. Thus, the main structure needs to have sufficient weight to overcome the angular moment force or be sufficiently anchored to a solid stationary surface to prevent tipping over. This is typically accomplished by bolting or otherwise securing the main structure to the floor or ground rendering these types of material lifting systems relatively permanent structures and difficult or cumbersome to move or reposition when desired.

Some examples of lifting systems, commonly referred to as vacuum lifting systems, incorporate suction or a vacuum to grasp, hold or otherwise secure the desired object to the vacuum lifting arm. These machines typically include a pump system for creating a negative pressure differential resulting in a suction or vacuum force between the lifting arm and the object to be held. Once the pump system has created the vacuum force securing the object, the lifting arm lifts the load which remains attached to the lifting arm as long as the pump system continues to create the negative pressure differential. In some cases, the lifting arm may be movable in order to lift and move the held object and reposition it about the workplace. The lifting arm may utilize the vacuum to move as well as lift the object.

Conventional vacuum lifting machines are also usually quite heavy, which is another reason why these machines are typically secured to the ground by fasteners, such as bolts, or other applicable fasteners or even by welding. Even where the lifting machines are relatively light, these machines still need to be firmly secured to a surface to prevent tipping over under load. This renders it harder to install the lifting machines at a particular location and reduces the possibility of the lifting machines being easily portable resulting in the need to purchase and install multiple expensive machines.

Accordingly, there is an established need for a solution to at least one of the aforementioned problems. For example, there remains a need for a load or material lifting system that is more easily securable to, and disconnectable from, a surface, in order to enhance portability of the system.

SUMMARY OF THE INVENTION

The present invention is directed to a vacuum-operated object-lifting system that utilizes air pressure differentials to anchor the lifting system to the floor or other structure and may also provide a source of suction for engaging and holding an object to be lifted. The vacuum lifting system includes a main structure have a recess, cavity or space defined in the bottom thereof and a lifting arm system extending from the main structure. The lifting arm system includes a lifting head which may have a recess, cavity or space to seal against an object to be lifted. The vacuum lifting system includes a vacuum pumping system including an air pump and a conduit system extending from the air pump to the recess, cavity or space in the bottom of the main structure. The air conduit system may also extend to the recess, cavity or space of the lifting head. Use of the air pump to draw air out of the conduit system creates pressure differential between ambient air pressure and air pressures in the recess, cavity or space of the main structure anchor the vacuum lifting system to the ground, and may also create pressure differential between ambient air pressure and the hollow interior of the lifting head to secure the object to be lifted.

In a first implementation of the invention, a load lifting system comprises a main structure having an interior and a bottom space. The main structure is configured to adopt an upright position in which the main structure rests on a surface and the bottom space faces the surface and is enclosed by the main structure and the surface. The load lifting system further includes a lifting arm extending from the main structure, the lifting arm configured to hold a load. An air pump system is housed in the interior of the main structure. An air conduit system provides fluid communication between the air pump system and the bottom space of the main structure. The load lifting system is operable to adopt a first working configuration, in which the main structure is arranged in the upright position and the air pump system is activated and providing a depression at the bottom space to attach the main structure to the surface by suction.

In a second aspect, the main structure may include a tower and a base plate provided at and extending transversely from a bottom of the tower. The bottom space may be defined on an underside of the base plate.

In another aspect, a proximal end of the lifting arm may be movably connected to the main structure. The lifting arm may further include a lifting head at a distal end of the lifting arm.

In another aspect, the lifting arm may extend from a top of the main structure, and may include an outward arm portion carried by and extending outward from the main structure and a downward arm portion carried by and extending downward from the outward arm portion.

In another aspect, the downward arm portion may be compressible to lift an object off of a surface in response to an air pressure differential between ambient air and air within an interior of the downward arm portion.

In yet another aspect, the outward arm portion may include a first arm segment carried by and extending outward from the main structure and a second arm segment articulately connected to and extending outward from the first arm segment. The downward arm portion may be carried by and extend downward from the second arm segment.

In another aspect, at least one of the first arm segment and the second arm segment may include a beam having a triangular cross-section.

In another aspect, the load lifting system may further include a control panel connected to the air pump system to operate the air pump system. The control panel may be accessible from outside the main structure.

In another aspect, the air pump system may include an air pump located in the interior of the main structure. The air pump may be configured to provide the depression to the bottom space of the main structure when the load lifting system is in the first working configuration.

In yet another aspect, the air conduit system may extend along the interior of the main structure between the air pump and the bottom space of the main structure.

In another aspect, the air pump system may be configured to provide a depression at the lifting arm to enable the lifting arm to hold a load by suction.

In another aspect, the air pump system may include a first air pump and a second air pump located in the interior of the main structure. The first air pump may be configured to provide the depression to the bottom space of the main structure when the load lifting system is in the first working configuration. In turn, the second air pump may be configured to provide the depression at the lifting arm to enable the lifting arm to hold a load by suction.

In another aspect, the air conduit system may extend between the air pump system and the lifting head.

In yet another aspect, the air conduit system may include at least one filter configured to filter air suctioned by and towards the air pump system. The at least one filter may be housed in the interior of the main structure.

In another aspect, the main structure may include an access panel for access to the at least one filter.

In another aspect, the main structure may include an access panel for access to the air pump system.

In another aspect, the load lifting system may be operable to adopt a second working configuration, in which the main structure may be arranged in the upright position and the air pump system may be activated and pumping air to the recess to provide an excess pressure that reduces a friction between the main structure and the surface.

In yet another aspect, the excess pressure may be configured to lift the main structure off of the surface.

Introducing another embodiment of the invention, the present invention consists of a method for securing a load lifting system to a supporting surface, the method comprising:
  providing an lifting system comprising:
    a main structure comprising an interior and a bottom space, the main structure configured to adopt an upright position in which the main structure rests on a surface and the bottom space faces the surface and is enclosed by the main structure and the surface;
    a lifting arm extending from the main structure, the lifting arm configured to hold a load;
    an air pump system housed in the interior of the main structure; and
    an air conduit system providing fluid communication between the air pump system and the bottom space of the main structure;
  positioning the main structure in the upright position on a securing surface; and
  activating the air pump system to evacuate air from the bottom space of the main structure to cause a pressure differential between the air in the bottom space of the main structure and the ambient air outside the lifting system to cause the resultant vacuum in the bottom space to secure the main structure to the securing surface.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a vacuum lifting system for grasping or holding objects with suction or a vacuum and lifting and moving the objects about a work area. The vacuum lifting system is portable and is temporarily anchored to a support surface or ground by use of the suction or vacuum.

Figure 1:
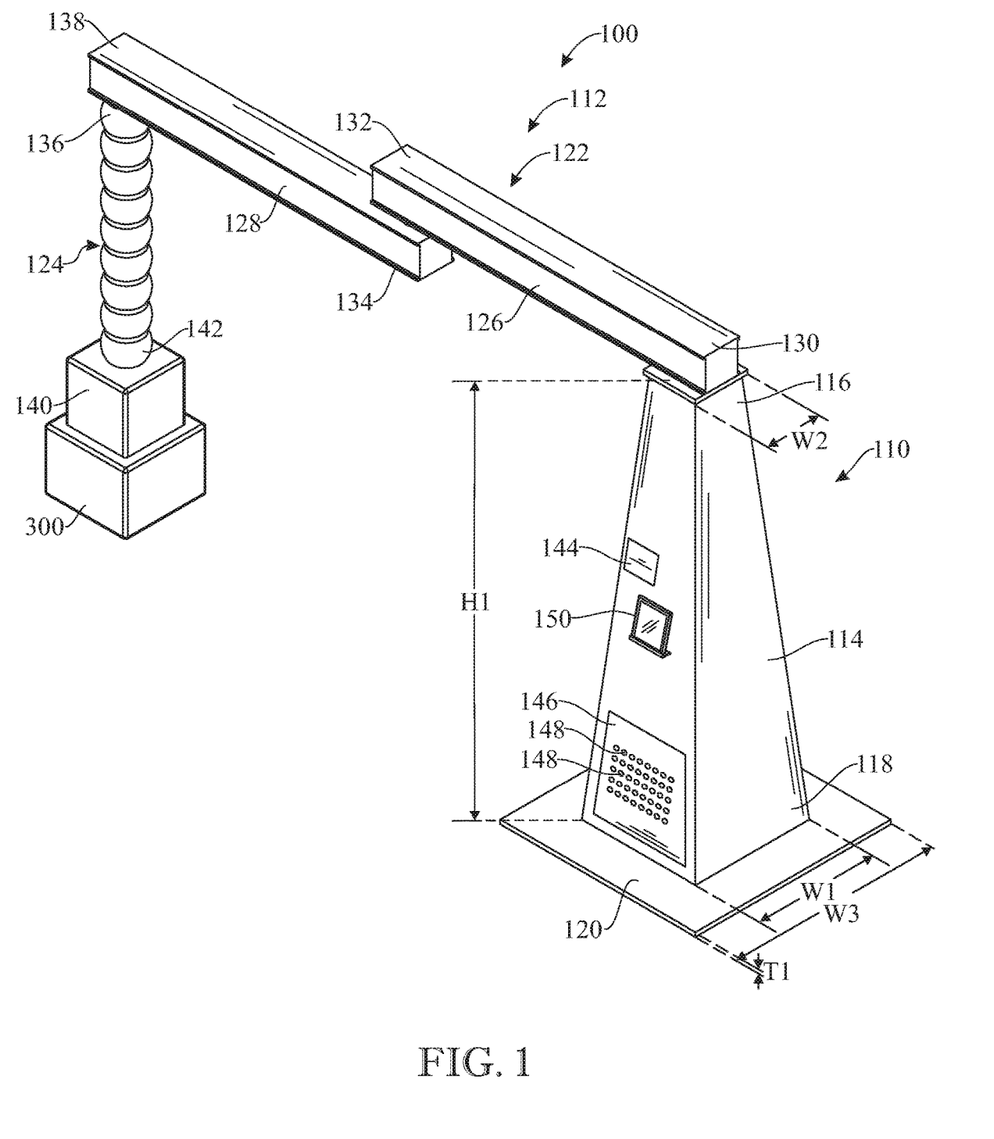
FIG. 1 presents a top, front isometric view of a vacuum lifting system in accordance with a first illustrative embodiment of the present invention.

Referring initially to FIG. 1, a vacuum lifting system 100 is illustrated in accordance with an exemplary embodiment of the present invention. The vacuum lifting system 100 is designed to lift and/or move an object or load such as, but not limited to, package 300 about a work area and generally includes a main structure 110 configured to be anchored to the ground or other surface and a lifting arm assembly 112 which extends from the main structure 110 and is provided to engage and lift the package 300. In a non-limiting example, the package 300 may be a medium-sized load which may weigh approximately 75 lbs.

The main structure 110 is provided to support the lifting arm assembly 112 and includes a standing or upright structure, enclosure or tower 114—hereinafter referred to generally as tower 114—having a top end 116 and a bottom end 118. The bottom end 118 of the tower 114 rests upon and is rigidly attached to an anchoring base plate 120 described in more detail herein below. While the tower 114 is shown as being generally pyramidical, other shapes for the tower 114 are contemplated such as, but not limited to, cylindrical, conical, frustoconical, rectangular, etc. In some embodiments, such as the present embodiment, the tower 114 may taper from a greatest width W1 at the bottom end 118 of the tower 114 to a narrowest or smallest width W2 at a top end 116 of the tower 114 to better downwardly bias or weigh down the bottom end 118 of the tower 114. The anchoring base plate 120 may present different shapes, such as, but not limited to, circular, oval, elliptical, rectangular, etc. For instance, the anchoring base plate 120 of the present embodiment is rectangular. The anchoring base plate 120 preferably has a width W3 greater than the width W1 of the bottom end 118 of the tower 114 to provide lateral stability to the main structure 110 as well as provide a relatively large anchoring surface area for the vertical lifting system 100. In other embodiments, such as in the event that the tower 118 is conical in shape, the anchoring base plate 120 may extend radially outwardly of the bottom end 118 of the tower to provide lateral stability and provide a strong attachment to the ground or other support surface. As noted in the figure, the tower 114 has a height of H1 while the anchoring base plate 120 has a height or thickness of T1.

With continued reference to FIG. 1, in order to reach outwardly away from the main structure 110 and grasp or secure package 300 initially located at ground level or on a table, conveyor or other support, the lifting arm assembly 112 may include an outward arm portion 122 extending outwardly from the tower 114, such as from the top end 116 of the tower 114, and a downward arm portion 124 extending downwardly from the outward arm portion 122. In some embodiments, the outward arm portion 122 may be generally horizontal and/or the downward arm portion 124 may be generally vertical. Alternatively or additionally, the outward arm portion 122 and/or the downward arm portion 124 may include or be divided into two or more segments; for instance, in the present embodiment, the outward arm portion 122 includes a first arm segment 126 and a second arm segment 128, while the downward arm portion 124 is formed generally of a single arm segment (e.g., a tube suspended from the outward arm portion 122). A first end 130 of the first arm segment 126 may extend from the tower 114 and a second end 132 of the first arm segment 126 may be connected to a first end 134 of the second arm segment 128. In different embodiments of the invention, the first and second arm segments 126 and 128, respectively, may be movable or non-movable relative to each other. In some embodiments, the first and second arm segments 126 and 128 and may be movable relative to the main structure 110.

As further shown in FIG. 1, a top end 136 of the downward arm portion 124 extends downwardly from a second end 138 of the second arm segment 128 of the outward arm portion 122 and terminates in a wholly or partially hollow lifting head 140 affixed to a bottom end 142 of the downward arm portion 124. It should be noted that, in some embodiments, such as the present embodiment, the downward arm portion 124 may be extendable and compressible in length to facilitate lifting the object 300 off of a surface and returning the object 300 to that or another surface as described in more detail hereinbelow. Alternative embodiments are, however, contemplated; for example, the lifting arm assembly 122 may be an articulated arm configured to articulately move to lift/lower the load while grasping or supporting the load.

Figure 3:
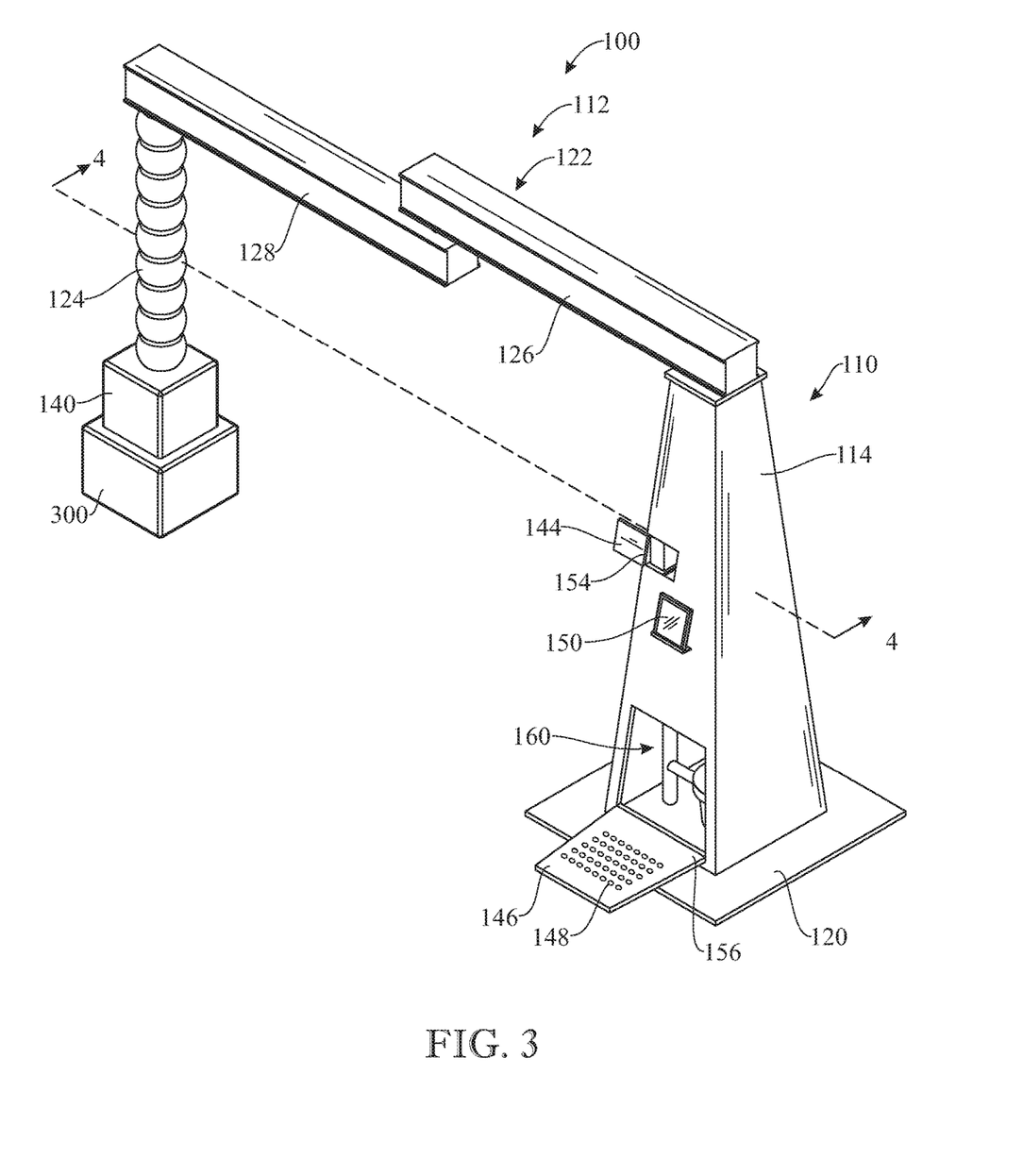
FIG. 3 presents a top, front isometric view of the vacuum lifting system of FIG. 1, with access panels removed.

With reference to FIGS. 1 and 3, the tower 114 is a preferably hollow receptacle having an interior 152 that encloses, and may also visually conceal, the main functional elements of the vacuum lifting system 100, which will be described in greater detail hereinafter. Thus, the tower 114 not only supports the lifting arm assembly 122 and the load or package 300, but also houses relevant subunits or subsystems of the vacuum lifting system 100, thereby facilitating installation and, especially, transportation and re-positioning of the vacuum lifting system 100 as will be described hereinafter. To facilitate access to subunits or subsystems housed within the interior 152, such as for repair and/or maintenance of said subunits or subsystems, the tower 114 may include one or more access panels, such as, but not limited to, a top access panel 144 provided at an intermediate height along the tower 114 and a bottom access panel 146 provided adjacent the bottom end 118 of the tower 114. When two or more panels are present, the panels may be provided on different sides or faces of the tower 114 or, more preferably, on a same side or face of the tower 114 as shown for instance in the drawings, which depict the top and bottom access panels 144 and 146 located on a same side of the tower 114. The bottom access panel 146 may be ventilated and include one or more perforations, windows or through holes 148 to supply an air flow into the tower 114 for exhausting and/or cooling a vacuum pumping system described below. The top and bottom access panels 144 and 146 may be opened and closed to provide or prevent, respectively, access to the interior 152 of the tower 114. The tower 114 may also include a user-operable interface, such as, but not limited to, a control panel 150 for direct user control of the vacuum pumping system and other systems of the vertical lifting system 100. Alternatively or additionally, control of the vertical lifting system 100 may be provided by either wired or wireless controllers connected locally or remotely (e.g., via a computer network) to the tower 114.

Figure 2:
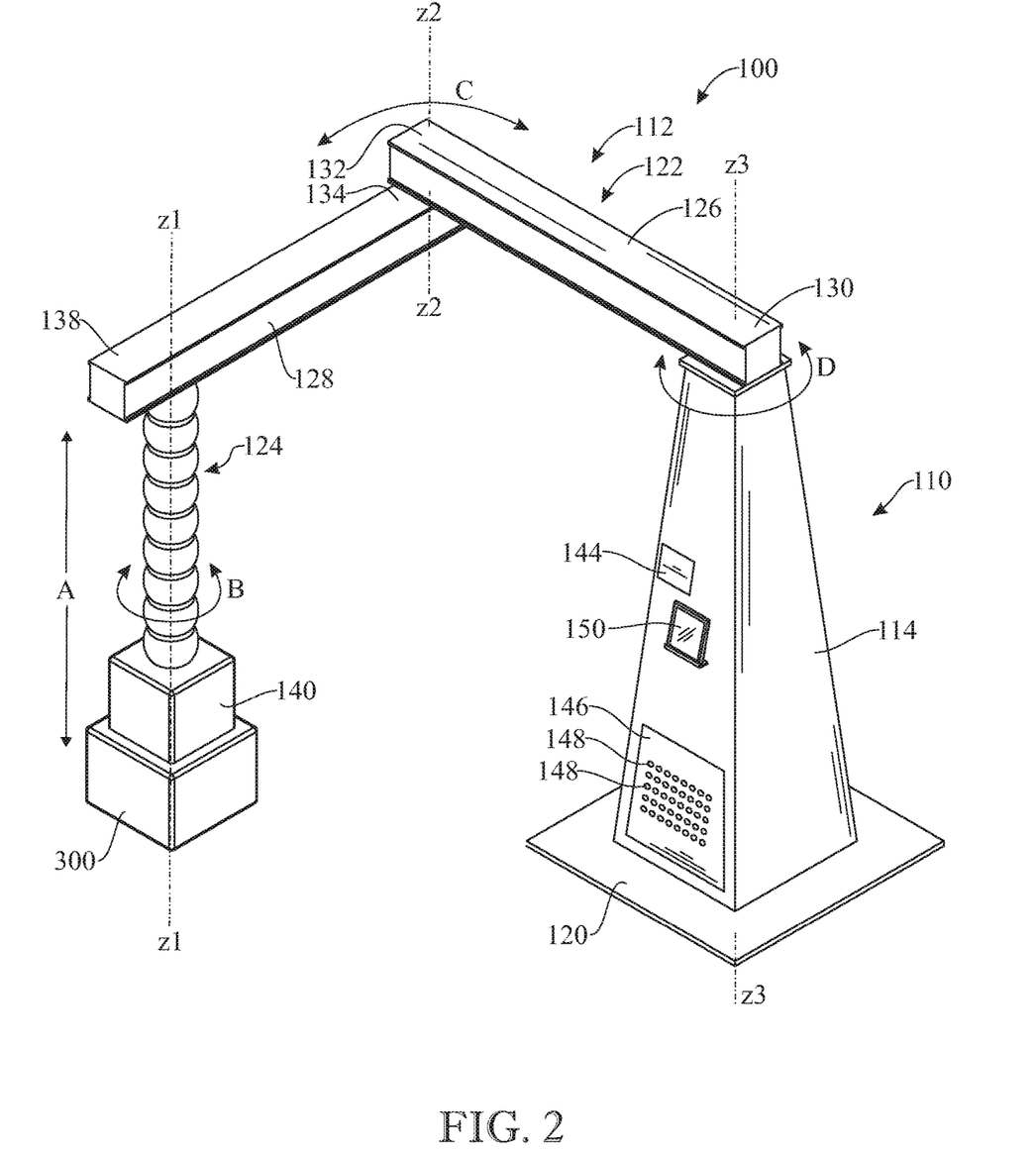
FIG. 2 presents a top, front isometric view of the vacuum lifting system of FIG. 1 illustrating motions of a lifting arm system of the vacuum lifting system lifting and moving an object held by the vacuum lifting system of the present invention.

Turning now to FIG. 2, as noted above, the vertical lifting system 100 is provided to lift and move a package, such as package 300, about a work space or area. As shown, the downward arm portion 124 and lifting head 140 are configured to move the package 300 vertically in the direction of arrow A. Additionally, in some embodiments, the downward arm portion 124 may rotate in the direction of arrow B, i.e. about a vertical axis z1-z1 extending through the downward arm portion 124, to orient the package 300 in a desired position. In some embodiments, the second arm segment 128 of the outward arm portion 122 may pivot or rotate at its first end 134 about an axis z2-z2 and in the direction of arrow C relative to the second end 132 of the first arm segment 126 of the outward arm portion 122 to move the package 300 closer to or further away from the main structure 110. Finally, in some embodiments, the entire lifting arm assembly 112 may be rotated in a direction of arrow D and about an axis z3-z3 extending generally through the first end 130 of the first arm segment 126 of the outward arm portion 122, to reposition the package 300 relative to the main structure 110; in some embodiments, the axis z3-z3 may extend vertically through the main structure 110. Control of these various rotations is carried out via user operation of the aforementioned control panel 150 and/or local or remote wired or wireless controllers. Furthermore, physical rotation of the different arm segments as herein described may be accomplished by use of mechanical devices (e.g., articulated connections, gears, and/or the like), which may be actuated, for instance and without limitation, by an electric motor, by a hydraulic actuator, or by the vacuum pumping system described hereinbelow.

As best shown in FIG. 3 and mentioned heretofore, the top and bottom access panels 144 and 146 provide access to the interior 152 of the tower 114. The top access panel 144 may be pivotally mounted to the tower 114 along a side edge 154 while the bottom access panel 146 may be pivotally mounted to the tower 114 along a bottom edge 156 of the bottom access panel. Alternatively, the top and bottom access panels 144 and 246, respectively, may be slidable, accordion-type, rotational, or otherwise movable or even separable and completely removable from the tower 114. Opening or removing the panels facilitates repair and maintenance of a vacuum pumping system 160 and other components housed in the tower 114, described hereinbelow.

With specific reference to FIG. 4, the vacuum pumping system 160 of the vertical lifting system 100 will now be described. The vacuum pumping system 160 is provided to generate a negative pressure gradient between the ambient air pressure and the air pressure within the lifting arm assembly 112 to create a suction on the package 300 thereby temporarily securing the package 300 to the lifting arm assembly 112. More specifically, in the present embodiment, the depression created by the vacuum pumping system 160 produces a suction force which secures the package 300 to the hollow lifting head 140. As long as said suction force lasts, i.e. while the vacuum pumping system 160 generates the aforementioned negative pressure gradient, the package 300 remains attached to the lifting arm assembly 112 and can thereby be lifted and moved around by moving the lifting arm assembly 112 as described heretofore.

Additionally, the vacuum pumping system 160 is configured to generate a negative pressure gradient between the main structure 110 and the factory floor 400, ground, or other surface on which the main structure 110 is supported. The negative pressure gradient, or depression, causes a suction force to be exerted on the factory floor 400, ground or surface, the reaction of which secures the main structure 110 to said floor, ground or surface. As long as said suction force lasts, i.e. while the vacuum pumping system 160 generates the aforementioned negative pressure gradient, the main structure 110 remains attached to the floor or ground by suction. In the present embodiment, for instance, the vacuum pumping system 160 more specifically attaches—or produces a contact between—the anchoring base plate 120 and the surface upon which the vertical lifting assembly 100 is mounted to more firmly anchor the vertical lifting assembly 100 to that surface. When the negative pressure ceases, the main structure 110 may become released from the ground or floor, if no other fasteners connect the main structure 110 to the ground or floor.

Figure 4:
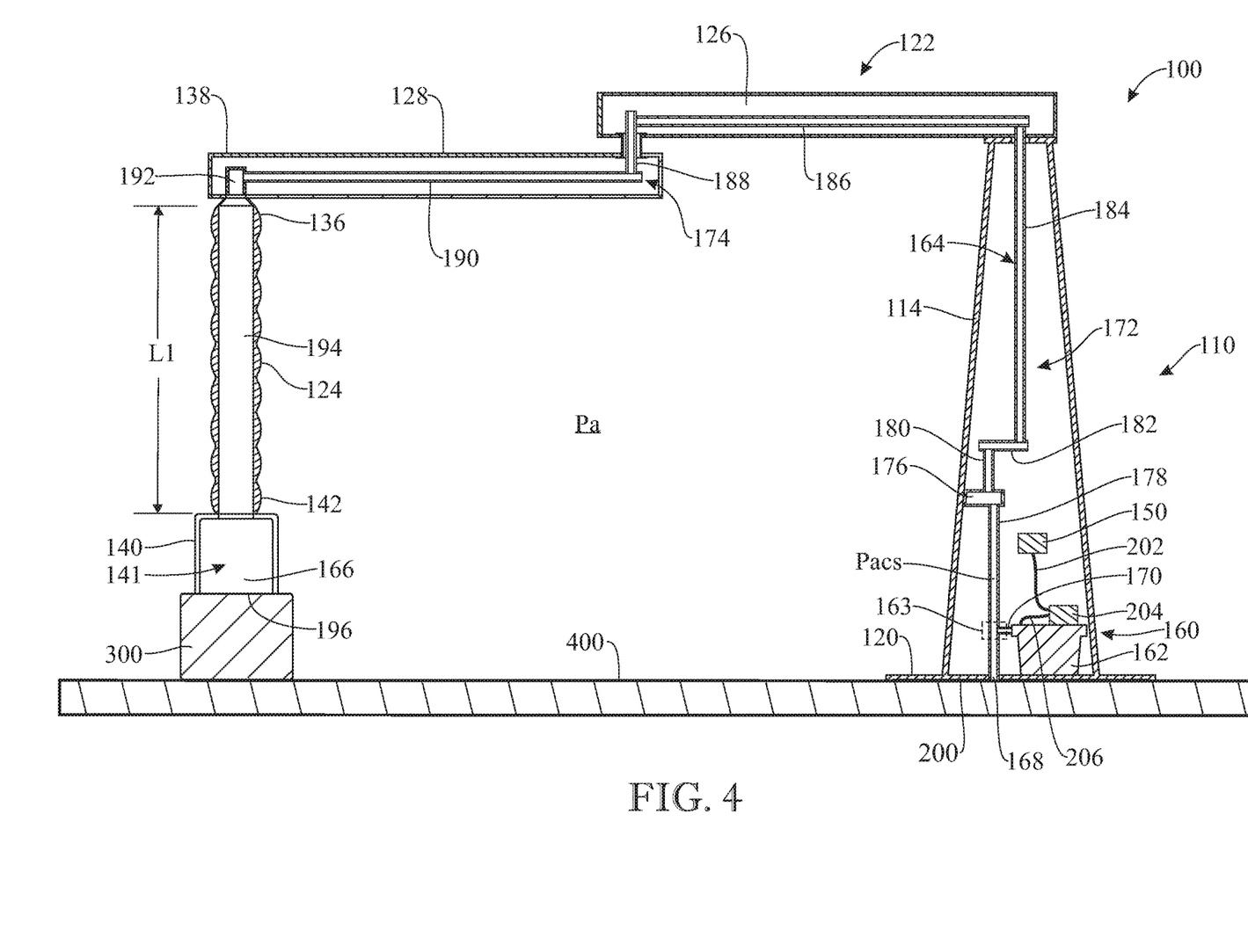
FIG. 4 presents a cross-sectional view, taken along line 4-4 of FIG. 3, of the vacuum lifting system of FIG. 1, shown in a first mode of operation, in which the vacuum lifting system is secured to a floor by suction.

With continued reference to FIG. 4, the vacuum pumping system 160 generally includes a vacuum generating air pump 162 and an air conduit system 164 extending from the air pump 162 to the distal end of the lifting arm assembly 112—i.e. to the hollow lifting head 140—and to the base of the main structure 110—i.e. to the anchoring base plate 120 of the main tower 114—. The air conduit system 164 may be formed from flexible tubing or hose, rigid piping or a combination thereof (hereinafter referred to generally as conduit). The air pump 162 can be powered by a direct connection to workplace 110V or 220V systems; alternatively or additionally, the vacuum lifting system 100 may include one or more onboard and/or external batteries configured to power the air pump 162.

The air pump 162 is provided to draw air out of the air conduit system 164 so as to provide a negative pressure gradient between the ambient air pressure Pa outside the vacuum lifting system 100 and the air pressure Pacs within the air conduit system 164. This pressure differential Pa-Pacs creates a vacuum within the air conduit system 164 which causes a suction effect at termination points of the air conduit system 164. A first termination point 166 is located within the distal end of the lifting arm assembly 112 while a second termination point 168 of the air conduit system 164 is located within the base of the main structure 110. In the non-limiting example shown in the drawings, the first and second termination points 166 and 168 are, more specifically, located within the hollow lifting head 140 of the lifting arm assembly 112 and the anchoring base plate 120 of the tower 114, respectively.

The air conduit system 164 may include a primary air conduit 170, an upward (e.g., vertical) conduit assembly 172 extending from and in fluid communication with the primary air conduit 170, and an outward (e.g., horizontal) conduit assembly 174 extending from and in fluid communication with the upward conduit assembly 172. An air filter 176 may be provided in the upward conduit assembly 172 and may be positioned behind a movable access panel (e.g., the top access panel 144) for ease of replacement and maintenance. The air filter 176 filters air coming through the air conduit system 164 from the hollow lifting head 140 to the air pump 162. Alternatively or additionally, the filter 176 may filter the air coming in from the anchoring base plate 120 to the air pump 162.

The primary air conduit 170 extends outwardly from the air pump 162 to the upward conduit assembly 172. Specifically, the primary air conduit 170 is connected to and in fluid communication with a first vertical conduit 178 of the upward conduit assembly 172. The first vertical conduit 178 connects to a second vertical conduit 180 through the air filter 176. The second vertical conduit 180 connects to a horizontal adjustment conduit 182 to route the upward conduit assembly 172 centrally within the tower 114 and the horizontal adjustment conduit 182 connects to a third vertical conduit 184.

The third vertical conduit 184 is connected to a first horizontal conduit 186 of the outward conduit assembly 174. The first horizontal conduit 186 is positioned within the first arm segment 126 of the outward arm portion 122 and is connected to a vertical adjustment or transfer conduit 188 extending between the first arm segment 126 of the outward arm portion 122 and the second arm segment 128 of the horizontal assembly 122. The transfer conduit 188 allows the first and second arm segments 126 and 128 to pivot relative to each other while maintaining fluid communication between the air pump 162 and the hollow lifting head 140. The transfer conduit 188 is connected to a second horizontal conduit 190 located within the second arm segment 128 of the outward arm portion 122. The second horizontal conduit 190 terminates in an expansion head 192 which is in fluid communication with an interior chamber 194 of the downward arm portion 124.

The interior chamber 194 of the downward arm portion 124 is in fluid communication with an interior 141 of the vertical lifting head 140. In some embodiments, such as the present embodiment, the vertical lifting head 140 may be hollow and open at a bottom end 196 thereof; in other embodiments, the vertical lifting head 140 may have one or more pressure enhancing chamber and suction ports to enhance the suction effect on the package 300. Thus, through the air conduit system 164 the air pump 162 is in fluid communication with the interior 141 and open bottom end 196 of the vertical lifting head 140. Furthermore, as described in more detail hereinbelow, the first vertical conduit 178, and thus the second conduit termination point 168, is in fluid communication with a recess, cavity or space 200 formed in the anchoring base plate 120. This provides a source of suction within the cavity 200 due to the negative pressure gradient Pa-Pacs. The control panel 150 may be connected directly to the air pump 162 through a primary wire 202 or through a separate controller 204 and a secondary wire 206.

Figure 5:
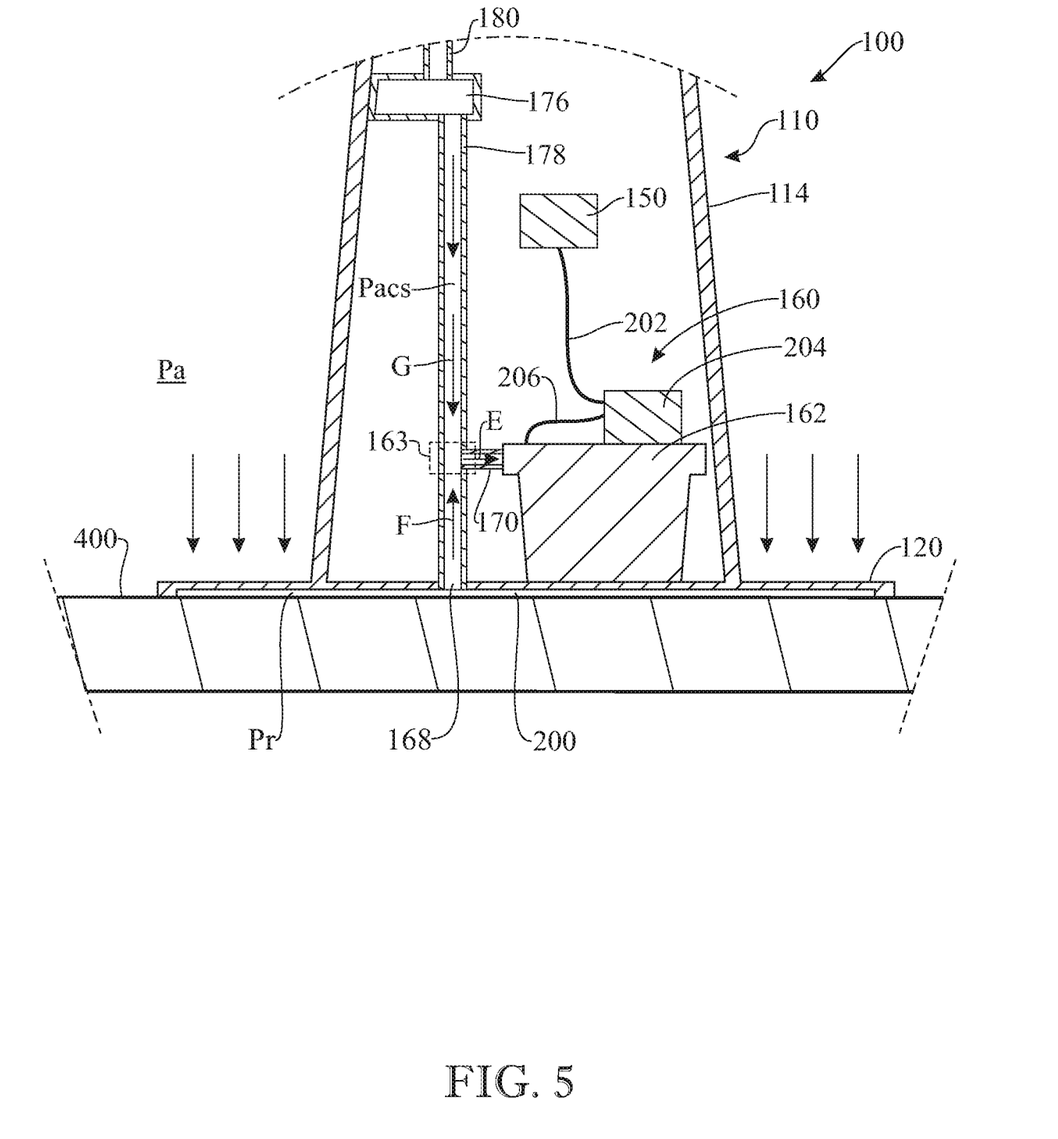
FIG. 5 presents an enlarged area of detail view of FIG. 4 illustrating the vacuum lifting system providing a negative pressure differential to secure the vacuum lifting system to a floor and to a conduit system the vacuum lifting system.
Figure 6:
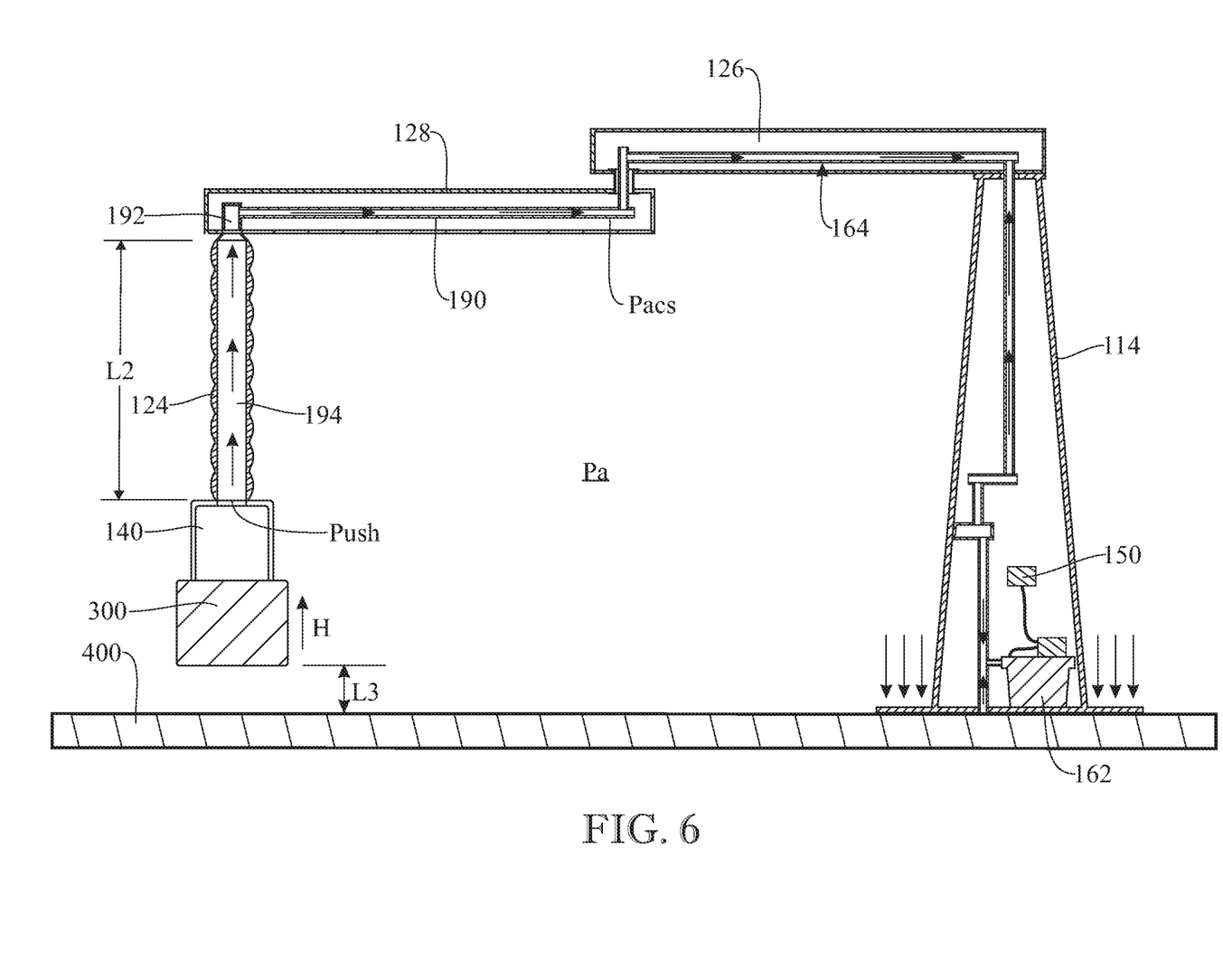
FIG. 6 presents a cross-sectional view, similar to FIG. 4, illustrating the use of the negative pressure differential of the vacuum lifting system of the vacuum lifting system of FIG. 1 to secure the vacuum lifting system to the floor as well as hold and lift an object off of the floor.

Turning now to FIGS. 5 and 6, and initially with regard to FIG. 5, the use and operation of the vertical lifting system 100 to secure and lift package 300 will now be described. The vacuum lifting system 100 is positioned on the ground, surface or factory floor 400, near the package 300 to be picked up. The control panel 150 or other controller is used to activate the air pump 162. The air pump 162 begins to evacuate or draw air through the primary conduit 170 in the direction of arrow E and out through an outlet (not shown) of the air pump. The exhausted air may be evacuated out of the tower 114 through the perforations, windows or through holes 148 in the second access panel 146, for instance and without limitation. As the air is drawn through the primary conduit 170, air is drawn in through the first vertical conduit 178 of the air conduit system 164 in the direction of arrow F below the primary conduit 170. The first vertical conduit 178 is open to the space 200 in the anchor base plate 120 through the second conduit termination point 168 of the air conduit system. As the air is drawn from the space 200 through the first vertical conduit 178, the air pressure inside space 200 in the anchoring base plate 120 drops creating a pressure differential between the ambient air pressure Pa outside the space 200 and the air pressure Pr within the space 200.

The removal of air from the space 200 continues until the air pressure within the space 200 is less than the ambient air pressure Pa. This pressure differential causes a vacuum within the space 200 thereby causing the anchoring base plate 120 to form a seal against the factory floor 400. It should be noted that, while not shown, various forms of seals may be provided in the anchoring base plate 120 around the space 200 to prevent air leakage into the space 200 due to any surface irregularities in the factory floor 400. Thus, the vacuum lifting system 100 is firmly secured to the factory floor 400 by the suction effect of the vacuum within the space 200 of the anchoring base plate 120. In this manner, the vacuum pumping system 160 firmly secures the tower 114 to the factory floor 400. The air pressure differential is maintained during the entire lifting operation.

Referring now to FIGS. 5 and 6, as the air is drawn through the first vertical conduit 178, air is also drawn through the first vertical conduit 178 in the direction of arrow G above the primary conduit 170. Since the first vertical conduit 178 is in fluid communication with the first conduit termination point 166 within the vertical lifting head 140, the air pressure Pvlh within the hollow lifting head 140 drops relative to the ambient air pressure Pa causing a vacuum within the hollow lifting head 140. The package 300 is held to the vertical lifting head 140 due to this pressure differential by suction of the vertical lifting head 140 on the package 300. As with the anchoring base plate 120, the hollow lifting head 140 may include one or more elastic seals at the bottom end 196 to prevent air leakage due to surface irregularities in the package 300.

As shown in FIG. 6, as the air pump 162 continues to draw air out of the air conduit system 164, the suction effect of the anchoring base plate 120 against the factory floor 400 increases and the suction effect of the hollow lifting head 140 on the package 300 increases. In embodiments in which the downward arm portion 124 is compressible, the suction within the interior chamber 194 of the downward arm portion 124 may cause the downward arm portion 124 to compress or shorten from an initial length L1 (FIG. 4) to a compressed length L2 shorter than L1 thereby lifting the package 300 off of the factory floor in the direction of arrow H a distance L3 equal to the difference between L1 and L2.

The package 300 can then be moved to a desired location by moving the outward arm portion 122 or may be simply held elevated until needed (e.g., until a conveyor passes underneath the package 300). Thereafter, the air pump 162 is operated to slowly release the air pressure within the air conduit system 164 which causes the downward arm portion 124 to expand setting the package 300 down where desired. Continued release of air pressure from within the air conduit system 164 releases the package from the hollow lifting head 140. Finally, complete release of the air pressure vacuum from within the air conduit system 164, by the stoppage of the air pump 162 or the complete release of the package 300, causes the vacuum within the space 200 in the anchoring base plate 120 to be released allowing the disclosed vacuum lifting system 100 to be easily moved to a new location.

With reference again to FIG. 4, in a specific embodiment, a valve and regulator system 163 may be positioned at the intersection of the primary conduit 170 and the first vertical conduit 178. The valve and regulator 163 may operate to ensure a greater pressure differential exists between the second conduit termination point 168 within the space 200 in the anchoring base plate 120 than at the first conduit termination point 166 within the vertical lifting head 140. This ensures that the vacuum within the space 200 in the anchoring base plate 120 will not be released prior to the package 300 being released from the hollow lifting head 140. The regulator may be preset to include a safety factor maintaining a higher pressure differential between the anchoring base plate 120 and the floor 400 than that between the hollow lifting head 140 and the package 300 to ensure that the vacuum lifting system 100 is securely anchored while the object 300 is being picked up, held and released. In some embodiments, the valve and regulator 163 may be configured such that a depression may be provided at the first conduit termination point 168 (i.e. at space 200), but not at the first conduit termination point 166, allowing the main structure 110 to be vacuumed to the ground without a vacuum being provided at the distal end of the lifting arm assembly 112.

It should be noted that, in an alternative embodiment, the vacuum pumping system 160 may incorporate two separate air pumps, operable independently, to provide separate and independent levels of suction to the anchoring base plate 120 and the hollow lifting head 140. A first air pump may be user operable to initially anchor the vacuum lifting system 100 to the ground or floor 400 while the second air pump operates to create the suction to hold and lift the package 300. For example, the first air pump may be in fluid communication with the third vertical conduit 184 and the second air pump may be in fluid communication with the first vertical conduit 178, there being no fluid communication between the first and third vertical conduits 178 and 184. A time delay, for example 10 seconds, may be built into the activation of the second pump to prevent operation prior to anchoring the vacuum lifting system 100 to the ground or other securing surface. As noted, a remote operation system may be provided to operate the disclosed vacuum lifting system 100 remotely. For example, a computer program or software application may run on an electronic or computer device located outside the main structure, locally or remotely, wired or wirelessly communicate with a processor or the control system such as directly over a computer network.

Figure 7:
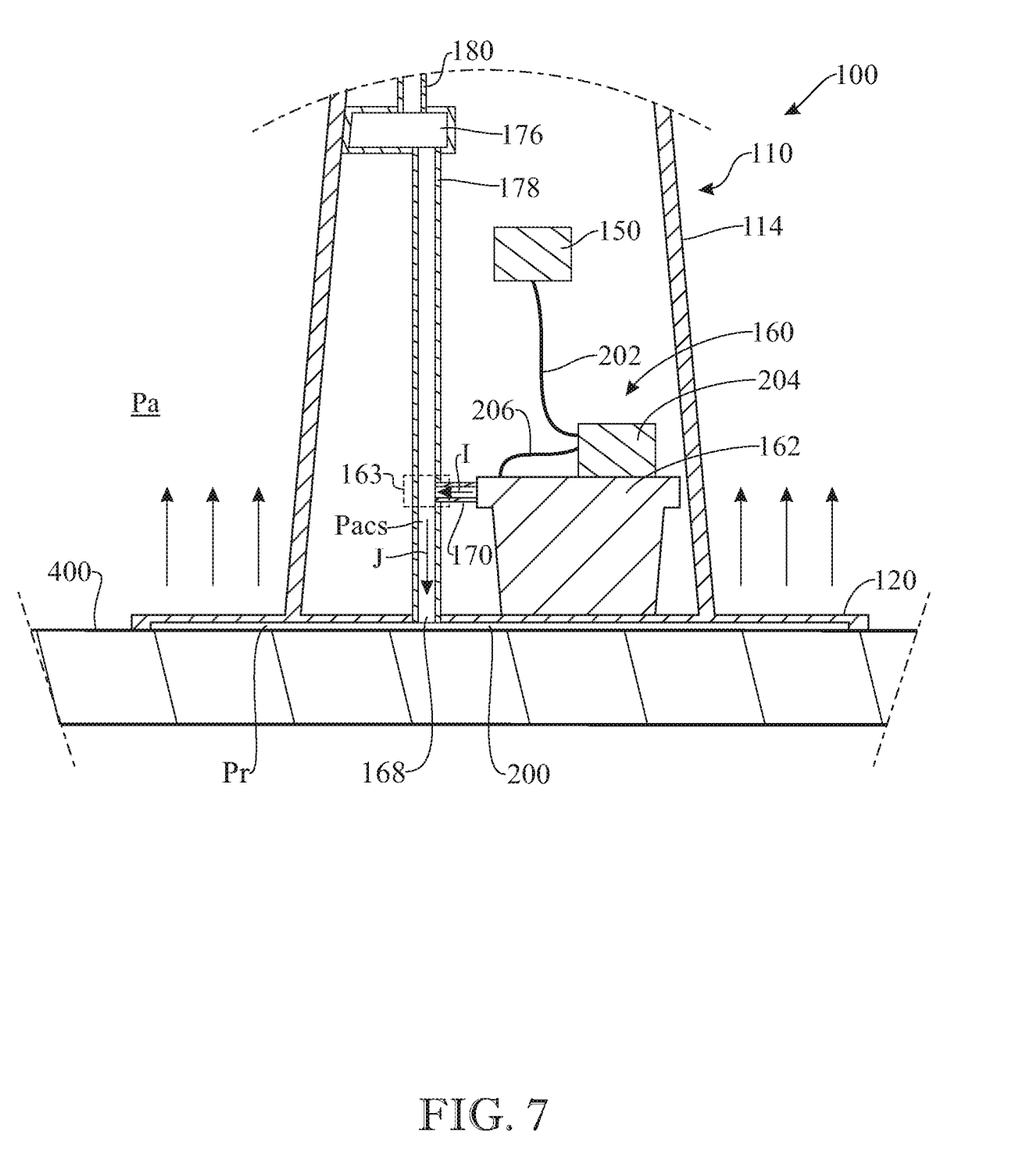
FIG. 7 presents an enlarged area of detail similar to FIG. 5, now illustrating the vacuum lifting system in a second mode of operation, in which the system is working in reverse and pumping air towards the floor, facilitating transportation of the vacuum lifting system along the floor.

The illustration of FIG. 7 shows a further aspect of the present invention. In some embodiments, the vacuum pumping system 160 may be further configured to operate in reverse, i.e., to provide a positive pressure or positive pumping by which the air pump 162 pumps air into the space 200. More specifically, as shown, the air pump 162 may pump air into the space 200 via the primary conduit 170 and the first vertical conduit 178, as indicated by arrows I and J, respectively, causing the air pressure Pacs within the air conduit system 164 and the air pressure Pr within the space 200 to increase and become higher than the ambient air pressure Pa outside the vacuum lifting system 100. As air is pumped into the space 200, the pressure increase exerts a vertically upward force on the tower 114. As air continues to be pumped into the space 200, said vertically upward force beings to counteract the weight of the vacuum lifting system 100 to reduce the friction between the tower 114 and the ground or factory floor 400 and facilitate sliding the vacuum lifting system 100 along the ground or floor. Further increased pumping eventually lifts the anchoring base plate 120 and tower 114 from the ground and further facilitates transporting the vacuum lifting system 100 along the ground by "hovering" the vacuum lifting system 100 over a thin sheet of airflow formed between the tower 114 and the ground or floor.

In some embodiments, the aforementioned valve and regulator system 163 may be configured such that, when the air pump 162 is switched to reverse, air flow from the air pump 163 towards the lifting arm assembly 112 is blocked or prevented, and air is only allowed to flow from the air pump 162 to the space 200, increasing efficiency. In other embodiments, mentioned heretofore, the vacuum pumping system 160 incorporate two separate air pumps, operable independently, the first air pump may be user operable to switch to reverse and lift or reduce friction between the vacuum lifting system 100 and the ground or floor 400 while the second air pump remains, for instance, in an off- or deactivated state.

Figure 8:
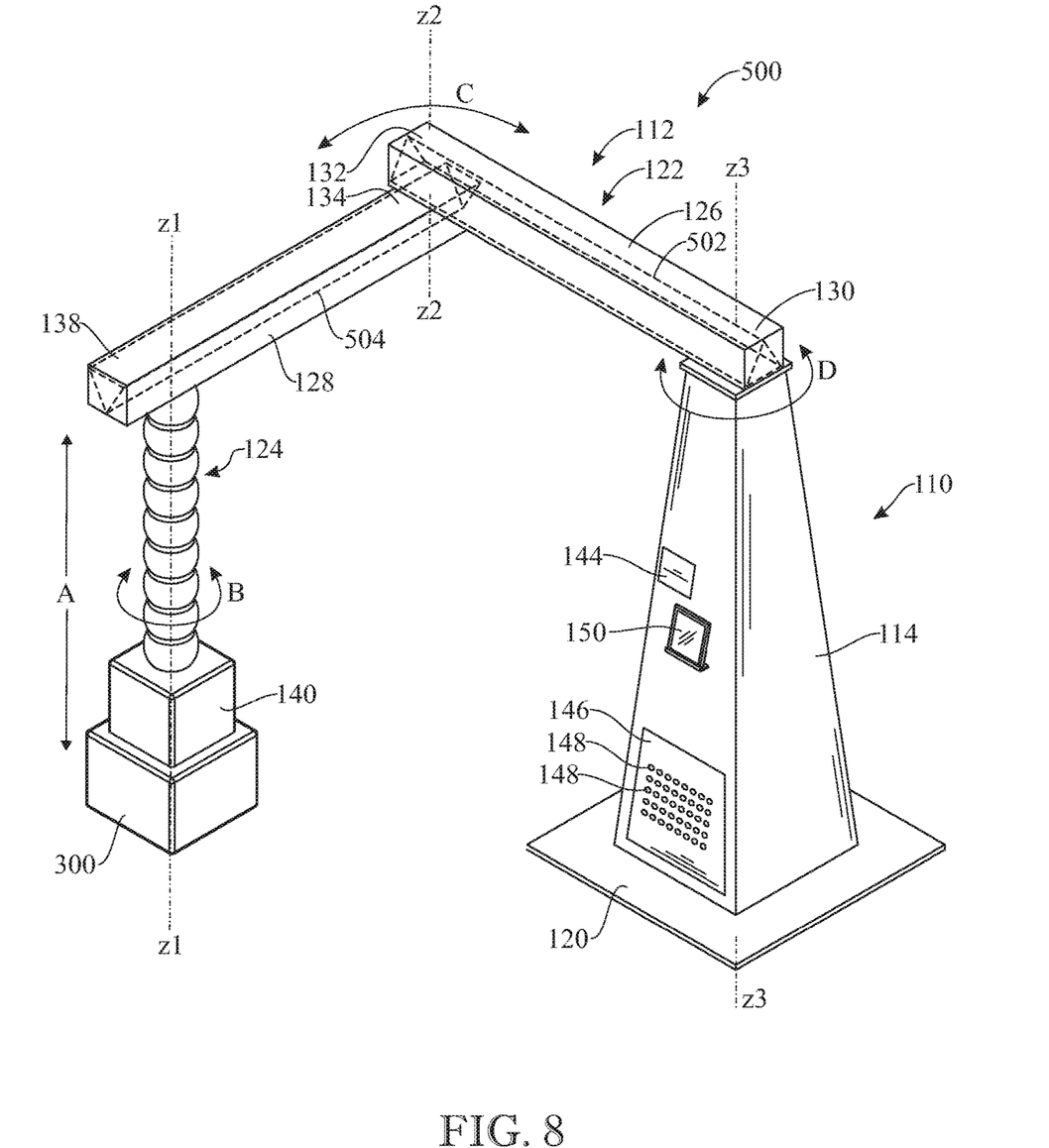
FIG. 8 presents a top, front isometric view of a vacuum lifting system in accordance with a second illustrative embodiment of the present invention, illustrating a lifting arm system comprising triangular beams.

The illustration of FIG. 8 presents a vacuum lifting system 500 in accordance with a further embodiment of the invention. The vacuum lifting system 500 of the present embodiment includes the same features as the previous embodiment, except for the mechanical construction and structure of the outward arm portion 122. While the first and second arm segments 126 and 128 of the previous embodiment comprised, or were formed by, a respective I-beam, the first and second arm segments 126 and 128 of the present embodiment include a respective triangular beam 502 and 504 (which may be arranged internally to a respective tube or outer structure). The triangular beams 502 and 504 are arranged with the base of the respective triangle facing each other. Such a configuration provides an increased resistance to torsion forces when the first and second arm segment 126 and 128 are rotated relative to one another in the direction of arrow C. Such increased resistance to torsion will lengthen the duration or life span of the vacuum lifting system 500, particularly when frequently lifting relatively heavy loads.

Finally, it should be noted that the vertical and horizontal configurations and orientation of the vacuum lifting system 100 may be altered so as to anchor the vacuum lifting system 100 to surfaces other than horizontal floors. Side anchoring plates having vacuum recesses may be provided to anchor the vacuum lifting system 100 to side walls, ceilings, etc.

As mentioned heretofore, preferably all electrical-controls, pumps, valves, hoses, filters, and valving components are mounted inside the tower 114. In some embodiments, only a power cord extends outward of the tower 114 to power the vacuum lifting system 100 an outside electrical power source.

Alternative embodiments are further contemplated. For example, in different embodiments of the invention, all or parts of the components mentioned herein may be made of metal, plastic, or combinations thereof. Furthermore, embodiments of the vacuum lifting system may be AC- or DC-powered.

In summary, a vacuum-operated, load-lifting system is disclosed that utilizes air pressure differentials to anchor the lifting system to the floor or other structure, thereby not requiring the use of bolts or other semi-permanent or permanent fasteners, and facilitating the transportation and repositioning of the lifting system in a facility. The load-lifting system may lift the load by suction.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A load lifting system comprising:
   a main structure comprising an interior and a bottom space, the main structure configured to adopt an upright position in which the main structure rests on a surface and the bottom space faces the surface and is enclosed by the main structure and the surface;
   a lifting arm extending from the main structure, the lifting arm configured to hold a load;
   an air pump system housed in the interior of the main structure; and
   an air conduit system providing fluid communication between the air pump system and the bottom space of the main structure; wherein
   the load lifting system is operable to adopt a first working configuration, in which the main structure is arranged in the upright position and the air pump system is activated and providing a depression at the bottom space to attach the main structure to the surface by suction.

2. The load lifting system of claim 1, wherein the main structure comprises a tower and a base plate provided at and extending transversely from a bottom of the tower, and further wherein the bottom space is defined on an underside of the base plate.

3. The load lifting system of claim 1, wherein a proximal end of the lifting arm is movably connected to the main structure, and the lifting arm further comprises a lifting head at a distal end of the lifting arm.

4. The load lifting system of claim 1, wherein the lifting arm extends from a top of the main structure and includes an outward arm portion carried by and extending outward from the main structure and a downward arm portion carried by and extending downward from the outward arm portion.

5. The load lifting system of claim 4, wherein the downward arm portion is compressible to lift an object off of a surface in response to an air pressure differential between ambient air and air within an interior of the downward arm portion.

6. The load lifting system of claim 4, wherein the outward arm portion includes a first arm segment carried by and extending outward from the main structure and a second arm segment articulately connected to and extending outward from the first arm segment, and further wherein the downward arm portion is carried by and extends downward from the second arm segment.

7. The load lifting system of claim 6, wherein at least one of the first arm segment and the second arm segment comprises a beam having a triangular cross-section.

8. The load lifting system of claim 1, further comprising a control panel connected to the air pump system to operate the air pump system, wherein the control panel is accessible from outside the main structure.

9. The load lifting system of claim 1, wherein the air pump system comprises an air pump located in the interior of the main structure, wherein the air pump is configured to provide the depression to the bottom space of the main structure when the load lifting system is in the first working configuration.

10. The load lifting system of claim 9, wherein the air conduit system extends along the interior of the main structure between the air pump and the bottom space of the main structure.

11. The load lifting system of claim 1, wherein the air pump system is configured to provide a depression at the lifting arm to enable the lifting arm to hold a load by suction.

12. The load lifting system of claim 11, wherein the air pump system comprises a first air pump and a second air pump located in the interior of the main structure, wherein the first air pump is configured to provide the depression to the bottom space of the main structure when the load lifting system is in the first working configuration, and the second air pump is configured to provide the depression at the lifting arm to enable the lifting arm to hold a load by suction.

13. The load lifting system of claim 11, wherein the air conduit system extends between the air pump system and the lifting head.

14. The load lifting system of claim 1, wherein the air conduit system comprises at least one filter configured to filter air suctioned by and towards the air pump system, wherein the at least one filter is housed in the interior of the main structure.

15. The load lifting system of claim 14, wherein the main structure includes an access panel for access to the at least one filter.

16. The load lifting system of claim 1, wherein the main structure includes an access panel for access to the air pump system.

17. The load lifting system of claim 1, wherein the load lifting system is operable to adopt a second working configuration, in which the main structure is arranged in the upright position and the air pump system is activated and pumping air to the recess to provide an excess pressure that reduces a friction between the main structure and the surface.

18. The load lifting system of claim 17, wherein the excess pressure is configured to lift the main structure off of the surface.

19. A load lifting system comprising:
    a main structure comprising an interior and a bottom space, the main structure configured to adopt an upright position in which the main structure rests on a surface and the bottom space faces the surface and is enclosed by the main structure and the surface;
    a lifting arm extending from the main structure, the lifting arm configured to hold a load;
    an air pump system housed in the interior of the main structure; and
    an air conduit system providing fluid communication between the air pump system and the bottom space of the main structure; wherein
    the air pump system is configured to provide a depression at the lifting arm to enable the lifting arm to hold a load by suction; and
    the load lifting system is operable to adopt a first working configuration, in which the main structure is arranged in the upright position and the air pump system is activated and providing a depression at the bottom space to attach the main structure to the surface by suction.

20. A load lifting system comprising:
    a main structure comprising an interior and a bottom space, the main structure configured to adopt an upright position in which the main structure rests on a surface and the bottom space faces the surface and is enclosed by the main structure and the surface;
    a lifting arm extending from the main structure, the lifting arm configured to hold a load;
    an air pump system housed in the interior of the main structure; and an air conduit system providing fluid communication between the air pump system and the bottom space of the main structure; wherein the air pump system is configured to provide a depression at the lifting arm to enable the lifting arm to hold a load by suction; and the load lifting system is operable to selectively adopt:
- a first working configuration, in which the main structure is arranged in the upright position and the air pump system is activated and providing a depression at the bottom space to attach the main structure to the surface by suction, and
- a second working configuration, in which the main structure is arranged in the upright position and the air pump system is activated and pumping air to the recess to provide an excess pressure that reduces a friction between the main structure and the surface.

* * * * *